United States Patent
Hoeye et al.

(10) Patent No.: US 6,957,232 B2
(45) Date of Patent: Oct. 18, 2005

(54) PROJECTOR CONTROL MARKUP LANGUAGE

(75) Inventors: Robin F. Hoeye, Tigard, OR (US); James D. Wenban, Wilsonville, OR (US)

(73) Assignee: Infocus Corporation, Wilsonville, OR (US)

( * ) Notice: Subject to any disclaimer, the term of this patent is extended or adjusted under 35 U.S.C. 154(b) by 0 days.

(21) Appl. No.: 10/195,092

(22) Filed: Jul. 11, 2002

(65) Prior Publication Data

US 2003/0191738 A1 Oct. 9, 2003

Related U.S. Application Data

(60) Provisional application No. 60/370,878, filed on Apr. 5, 2002.

(51) Int. Cl.[7] .............................................. G06F 17/00
(52) U.S. Cl. ....................... 707/104.1; 707/10; 715/744
(58) Field of Search ......................... 707/1, 3, 10, 100, 707/104.1; 348/725, 731–734; 355/18, 55, 25; 710/1, 5, 15–19; 715/700, 733, 744, 751, 752

(56) References Cited

U.S. PATENT DOCUMENTS

| | | | |
|---|---|---|---|
| 6,269,403 B1 * | 7/2001 | Anders | 709/231 |
| 6,330,529 B1 | 12/2001 | Ito | 704/3 |
| 6,339,832 B1 | 1/2002 | Bowman-Amuah | 714/35 |
| 6,342,907 B1 | 1/2002 | Perry et al. | 345/762 |
| 6,400,996 B1 * | 6/2002 | Hoffberg et al. | 700/83 |
| 6,509,910 B1 * | 1/2003 | Agarwal et al. | 345/752 |
| 6,539,396 B1 * | 3/2003 | Bowman-Amuah | 707/101 |
| 6,704,723 B1 * | 3/2004 | Alavi et al. | 707/3 |

OTHER PUBLICATIONS

Wakikawa, R., Trevor, J., Schilit, B., Boreczky, J., "Roomotes: ubiquitous room-based remote control web phones", www.fxpal.com/people/archive/schilit/Roomotes-SIGCHI2001.pdf, pp. 1–2.*

* cited by examiner

*Primary Examiner*—Greta Robinson
*Assistant Examiner*—Harold E. Dodds, Jr.
(74) *Attorney, Agent, or Firm*—Alleman Hall McCoy Russell & Tuttle LLP

(57) ABSTRACT

The present invention provides a method and system for controlling a controllable device, such as a projection device. In some embodiments of the invention, a projection system is provided including a projection device and a controller linked to the projection device via a network. The controller may be configured to query and command the projection device using a Projector Control Markup Language (PCML) defined using Extensible Markup Language (XML).

20 Claims, 2 Drawing Sheets

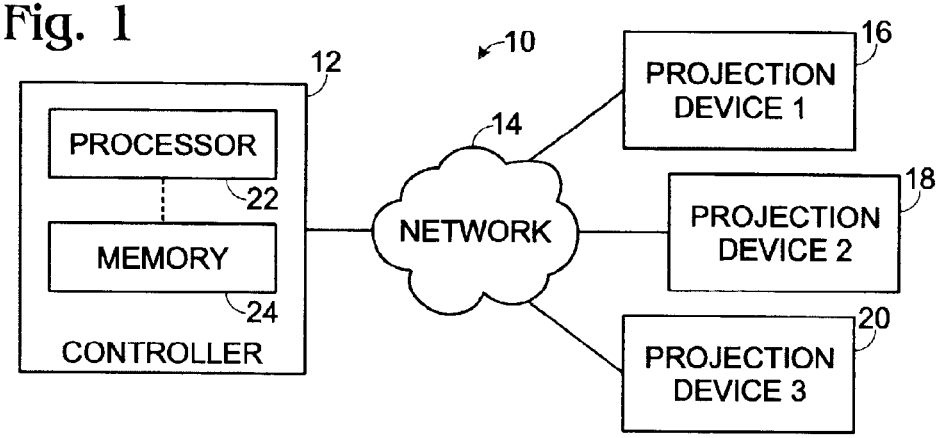
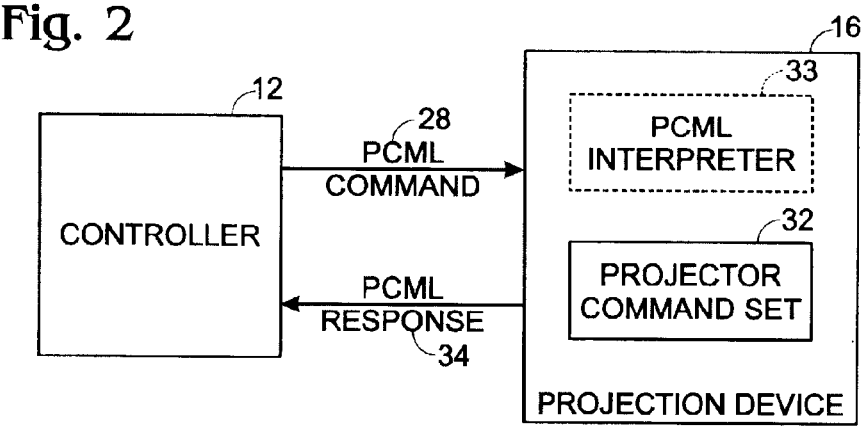
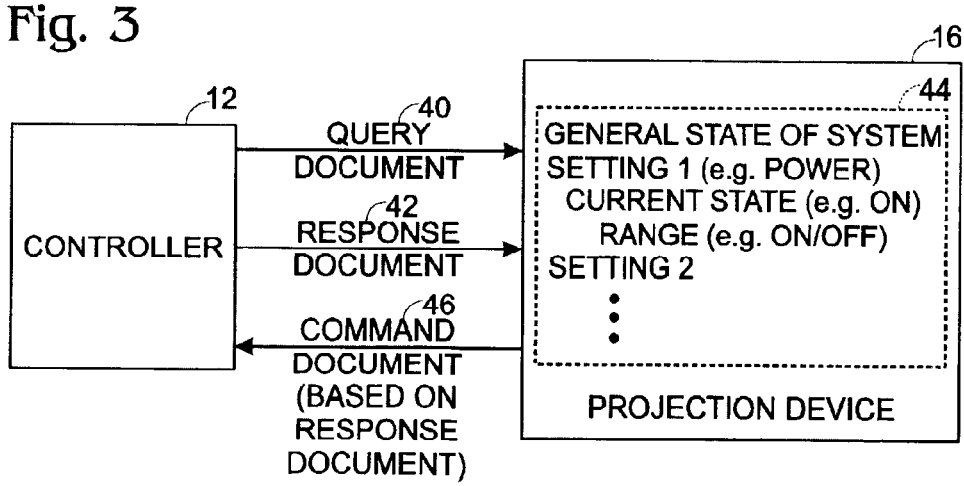

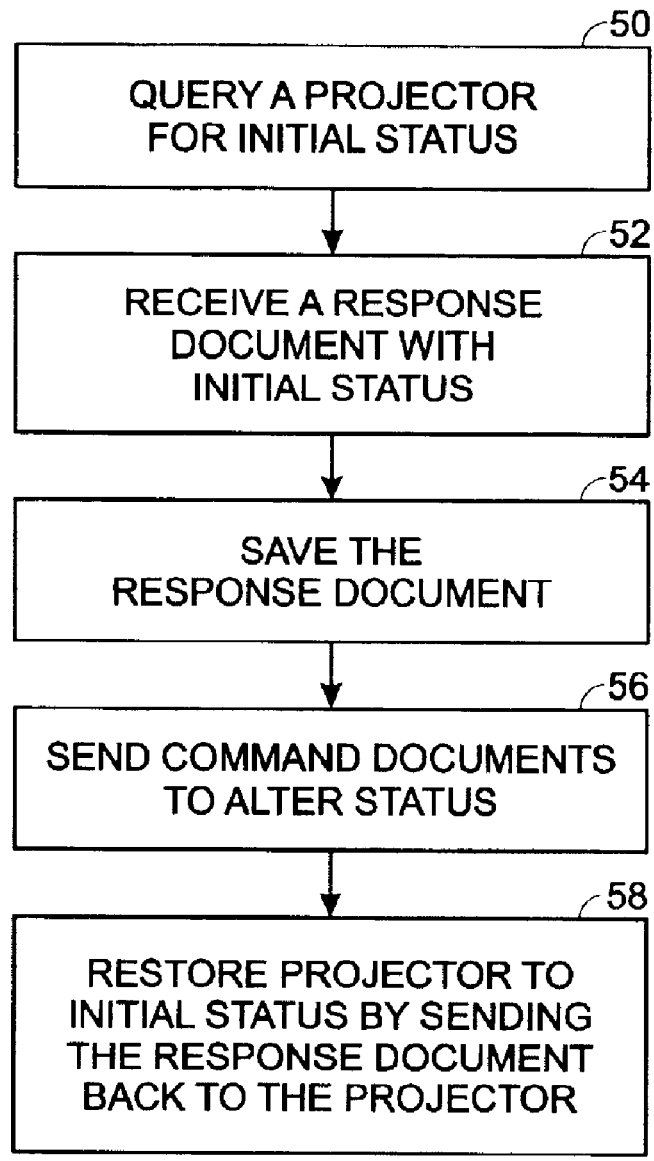

PROJECTOR CONTROL MARKUP LANGUAGE

CROSS-REFERENCE TO RELATED APPLICATIONS

This application claims priority from U.S. Provisional Patent Application Ser. No. 60/370,878, which was filed on Apr. 5, 2002, of Robin F. Hoeye and James D. Wenban for a PROJECTOR CONTROL MARKUP LANGUAGE, the disclosure of which is hereby incorporated by reference.

TECHNICAL FIELD

The present invention relates generally to a system for controlling controllable devices, and more particularly, to a language for controlling projection devices.

BACKGROUND OF THE INVENTION

In recent years, image-generation devices, such as digital projectors, have become increasingly popular as a tool for the presentation of content to an audience. Such image-generation devices are typically used to project a computer-generated presentation onto a viewing surface, enabling users to easily present high-quality, professional appearing images to audiences of varying sizes. As a result, such image-generation devices are often found as permanent fixtures in conference rooms and other meeting facilities.

Many different types of image-generation devices are available. The different image-generation devices may use different command languages. Specifically, different image-generation devices typically include unique command structures, sentence structures, punctuation, parsers, etc. which may be unfamiliar to a user. The different command languages and the lack of standardization may impede the ease of using, programming, and managing image-generation devices.

SUMMARY OF THE INVENTION

The present invention provides a method and system for controlling a controllable device, such as a projection device. In some embodiments of the invention, a projection system is provided including a projection device and a controller linked to the projection device via a network. The controller may be configured to query and command the projection device using a Projector Control Markup Language (PCML) defined using Extensible Markup Language (XML). In another embodiment of the invention, a projection system is provided including a controller configured to send projector control markup language command documents defined in extensible markup language. The system further includes a projection device coupled to the controller configured to receive and respond to the projector control markup language commands.

In some embodiments of the invention, an apparatus coupled with at least one projection device is provided where the apparatus includes a processor, memory coupled to the processor, and a projector control markup language defined using extensible markup language residing in the memory for controlling the at least one projection device. In yet another embodiment, a program storage device is provided which is readable by a machine. The storage device tangibly embodies a program of instructions executable by the machine to perform a method for use in controlling a projection device. The method may include sending projector control markup language command documents defined in extensible markup language to a projection device, and receiving response documents from the projection device.

In another embodiment of the invention, a method for controlling a projection device is provided. The method may include sending a query to the projection device requesting the state of the projection device, receiving a response from the projection device including the state of the projection device, and sending the response back to the projection device as a command thereby directing the projection device to be restored to the state of the projection device when the response from the projection device was generated. Similarly, another method may include providing a projector control markup language defined using extensible markup language, querying a projection device for its capabilities using a projector control markup language query, identifying the capabilities of the projection device via a response document, and controlling the projection device using the response document.

In another embodiment, a projector control language for projection devices is provided. The language may include a general query defined in extensible markup language adapted to request the status of a projection device, and a plurality of human-readable elements and attributes configured to identify the status and capabilities of the projection device.

BRIEF DESCRIPTION OF THE DRAWINGS

FIG. 1 is a schematic representation of a projection system including multiple projection devices adapted to use a Projector Control Markup Language (PCML), according to one embodiment of the present invention.

FIG. 2 is a schematic representation of a controller and a projection device sending and receiving PCML commands and responses, according to one embodiment of the present invention.

FIG. 3 is a representation of a controller sending a query document and receiving a response document containing status information about the projection device, according to one embodiment of the present invention.

FIG. 4 is a flowchart demonstrating a method of controlling and restoring a projection device to an initial status, according to one embodiment of the present invention.

DETAILED DESCRIPTION OF THE PREFERRED EMBODIMENTS

The present invention provides a Projector Control Markup Language (PCML). PCML enables a user to control, command, and program a controllable device, such as a projection device. As used herein, a projection device or image-generating device may include any suitable display device or image projector, including, but not limited to, a digital projector, a liquid crystal display (LCD) projector, a Digital Light Processing™ (DLP™) projector, etc.

Referring initially to FIG. 1, a projection system is illustrated generally at 10. Projection system 10 typically includes a controller 12 linked via a network 14 to at least one projection device, 16, 18, or 20. Controller 12 may be any suitable computing device, including, but not limited to, a personal computer, a hand-held computer, a portable computer, a desktop computer, a server, etc. Controller 12 typically includes a processor 22 and a storage area or memory 24. Memory, as used herein, may include any type of data storage, including, random-access memory (RAM) and/or read only memory (ROM). Moreover, memory may include a mass storage device, which may take the form of a hard drive, floppy disk, flash memory, CD ROM, etc.

PCML enables communication between controller 12 and any one of the linked projection devices 16, 18, 20. PCML is a device command language defined in Extensible Markup Language (XML). As an ASCII based language, XML is extremely compressible, thereby minimizing the document sizes. As described in more detail below, PCML defines an XML vocabulary for commanding and controlling projection devices, such as projection devices 16, 18, and 20, regardless of whether the command sets (set of instructions to perform specific tasks) for the projection devices are initially known by controller 12. PCML further provides both upward and downward compatibility with different projection devices by standardizing the parameters or elements incorporated within the commands.

One advantage of PCML includes the use of human-readable words within the commands and responses. For example, the use of XML with ASCII encoding and English-derived element names enables both the command and response documents to be human readable and parseable in a desired language, such as in English. Thus, a human may be able to inspect any arbitrary command or response document and infer the meaning and effect of the document without further information. By providing such a decodable language, it is possible to easily program or otherwise alter the status and operation of the projection device. It should be understood that PCML may be translated such that languages other than English are used, and therefore, the PCML may be decodable and readable to non-English readers.

Because PCML is based on XML standards, PCML may be viewed via known applications, for example, web browsers, such as Internet Explorer 5.0. For example, PCML commands and responses may be accessed and manipulated on a screen using known browsers. Moreover, XML is platform independent, and thus the PCML commands, which are defined using XML, are also platform independent.

PCML may utilize only a subset of XML features. The subset of XML features may be implemented within a very small memory footprint. Depending on the projection device, the grammar required for a particular projection device may grow and shrink with need. Such adaptation enables the development of custom commands for each projection device or other controllable device as needed or desired.

As an XML-based language, PCML typically follows the rules required in the XML specification maintained by the World Wide Web Consortium (W3C). As an XML based language, PCML includes elements and attributes specific to projection system 10. For example, PCML includes elements that define the primary constructs or commands within the PCML document. The elements are typically contained within start and end tags defined by the characters "<" and ">" respectively. Typically, PCML includes a root element, such as <pcml/>, as the highest-level element in the language. Such a root element provides a reference point that enables an XML parser or XML-enabled application coupled to a projection device to recognize and identify the beginning and end of a PCML document.

Various child elements also may be defined within PCML, including human-parseable child elements, such as system, status, administration, source, etc. In some embodiments of the present invention, the child elements may be constrained. For example, the child elements may be limited to zero or one time, thereby limiting the size of the document and the memory needed to store the document in the device. PCML further may include attributes that describe each element in more detail. Attributes typically include their respective values in the form of <element attribute="value">.

As shown in FIG. 2, a projection device may be controlled via a controller using a two-step process: step 1—querying and/or commanding the projection device (sending a PCML command document) and step 2—responding to the query/command (sending a PCML response document). In the illustrated embodiment, controller 12 is configured to send PCML command documents, to projection devices coupled to the network. Typically, for every command document, there is only one response document.

Projection device 16 may identify, recognize, and respond to a PCML command document. In some embodiments, the PCML command document is identified and recognized as a PCML command document by a PCML interpreter 30 coupled with projection device 16. The PCML interpreter may be an application program that resides within the projection device. For example, the PCML interpreter may be installed and stored on the projection device. Alternatively, the PCML interpreter may be stored external to the projection device. PCML interpreter 30 enables projection device 16 to communicate its projector command set 32 back to controller 12 through a response document 34. A projection device coupled with a PCML interpreter is a PCML-enabled projection device.

The PCML interpreter typically includes a standard XML parser to parse the command document. Parse, as used herein, includes the process of examining a sequence of characters and breaking the sequence into understandable parts. Thus, as described above, the PCML document may be parsed by the projection device into its different components, including elements and attributes. It should be appreciated that the use of a standard XML parser effectively eliminates the need for the projection system to have different parsers for each different projection device utilizing a different command language.

Not all XML constructs are utilized within PCML. For example, in some embodiments, the memory footprint for the parser may be minimized by limiting PCML to include only elements and attributes. Thus, in some embodiments, other XML constructs, such as parsed character data (PCDATA), may be eliminated from PCML, thereby minimizing the size of the required parser.

In some embodiments, the projection system further may include a validator to validate, or check, the XML syntax used to define the PCML. The validator may be contained within the interpreter or parser. In some embodiments, the validator may be located on the projection device, while in other embodiments it may be located prior to the projection device, such as in the controller. A prevalidator, where validation occurs prior to the projection device, may reduce the amount of embedded code needed on the projection device. Such a validator may eliminate and/or reduce the projection device from throwing errors.

PCML provides a universal language by which commands, queries, and responses may be sent between controller 12 and projection device 16. As described above, commands may be used to control and change the status/state of the projection device while queries simply ask the projection device its current state, either generally or specifically. Queries typically do not include any value-defined attributes. Both commands and queries may be contained within a command document. Typically, responses include status information and range information from the projection device.

Both commands and queries may be sent as PCML documents from controller 12 to projection device 16. Typically, projection device 16 receives a command document, which may include both commands and queries, parses the document, and responds with response document 42. Response document 42 may include elements, sub-elements, and attributes which describe the state of the device. For example, response document 42 may include the projection device's current state or status, changed state or status, and/or the range of possible states. Thus, if the controller 12 sends a query and the query is a general query, a document that requests the entire state of the device, a general response document containing the entire state of the device, including general status information, may be sent back to controller 12. As described above, general status information may include information on the features available for the particular projection device, including, but not limited to, settings, controls, power source, volume, etc. Alternatively, if the query is a specific query, a document that requests only a subset of information pertaining to the projection device, the projection device may respond with a specific response document containing only the requested subset of information.

As mentioned above, PCML provides a language by which a projection device may communicate to a controller the capabilities and features that are available for the specific projection device. Such communication is illustrated in FIG. 3. First, controller 12 may send a query document 40 to projection device 16. As described above, query document 40 may be a general query that requests the complete state of the projection device. Such a query may take the form of a single root element, such as "<pcml/>". Query document 40 also may be configured to request both the current state and range of possible states of linked projection device 16. In response, the projection device may send a PCML response document identifying its general state and range of states. The general state may include information as to the projection device's status, including, but not limited to, available settings, the range of settings, the current status, etc.

The command sets for the projection devices may be maintained in a tree-structured hierarchy, also thought of as a hierarchical command tree, whereby the commands are organized with primary commands and multiple subcommand levels. Thus, in addition to a general query, query document 40 also may be used as a specific query (described briefly above) to request the status at any node or branch of a hierarchical command tree. The element at each branch point may be used as a specific query for that branch, and the status of all elements within that branch may be returned upon such a query. Thus, PCML may be used to send both general queries (general status and capability requests) as well as specific queries/commands to a projection device.

In PCML, the command documents may include queries, commands, or a combination of both queries and commands. Thus, a single PCML command document may change some settings, while querying other settings. For example, when the controller sends a command document to a projection device, the command document may include both a command and a query as to the state of the projection device. The projection device may respond in a response document directly to the query portion of the command document reporting status of a queried branch, leaf, etc. Moreover, upon receipt of the command portion of the command document, the projection device may act to meet the command by changing a setting or otherwise performing the requested command. The new setting value may be returned to the controller in a response document. The controller may later use this response as a command to return the device to a desired state.

For example, and as illustrated in FIG. 3, projection device 16 may have multiple system settings 44, including a power setting. The power setting may include an "on" state, an "off" state, a reserve state, etc. The illustrated projection device is shown in an "on" state and includes a range of "on"/"off". Upon receiving a query document for the power settings, the projection device may respond with the following response document:

```
<pcml>
    <System>
        <Power value = "on" range= "off,on"/>
    </System>
</pcml>
```

The above-response document conveys both the current power state, "on", and the range of power states, "off,on", of projection device 16 to controller 12. It should be appreciated that the power setting is used purely as an illustration and that the response document may provide information on any one or more features, including other system settings and controls, status settings, administrative sources, etc.

Upon receiving the system and status information, controller 12 may then control those aspects of projection device 16 described by response document 42. Typically, both the system and status information is stored such that controller 12 may use the information to command the linked projection device. Upon receiving the command set of a particular projection device, controller 12 may then send commands 46 based on that set to control coupled projection device 16. Thus, the commands used by controller 16 are tailored to a specific projection device's capabilities. As a result, PCML is adaptable to different projection devices. Furthermore, controller 12 need not have any prior knowledge of a specific projection device's command set because of the ability to query a PCML-enabled projection device and garner the commands and features specific to the projection device.

As stated above, the response document may be in the command language format, and thus, may be used as a command document. Such a response creates symmetry within the language. The language symmetry occurs in the sense that the controller may resend a response document from the projection device back to the projection device as a command document. Such a command effectively directs the projection device to reset/restore itself to the state specified in the response document sent to the controller from the projection device. For example, the following PCML query may be sent by a controller to a projection device:

```
<pcml/>
```

The projection device may respond to the query:

```
<pcml><setting attribute="value"/></pcml>
```

The response may be saved and then resent to the projection device restoring the projection device to the state when the response from the projection device was generated.

This symmetry is available for any level of the command tree. For example, the controller may send a query asking for the state of the projection device at any node in the command tree. The status of all elements below that node may be returned as a response document. Such a response document may later be resent to reset the elements to the status of the elements at the time of the original query.

The symmetry of the system decreases the possibility of command errors being sent to the projection device. For example, in conventional systems, errors may occur when the controller sends a command to a projection device where the command is outside the capabilities of the projection device. However, in the current system, errors are less likely because the commands are based on, or limited by, the information received from the projection device in response to the general query. Thus, the controller is unlikely to receive an error when the controller sends the response document back to the projection device as a command document, since the projection device created the original response document.

Commands that are based on the queried ranges and capabilities of the projection device are unlikely to "throw" errors. In conventional systems, a projection device may attempt to respond to an incorrect command. Such attempts to respond to an invalid command may result in the projection device delivering an error message to the user, locking up, preventing performance of the projection device or a feature of the projection device, etc. However, in the present system, the projection device simply may ignore any invalid commands that do not correspond to the projection device's capabilities or features. Prevalidation, as discussed previously, may further help to prevent ignored commands, which provide no feedback messages.

A method for controlling a projector or projection device using a symmetrical based command and response language is shown generally at 48 in FIG. 4. The method includes, at 50, querying a linked projection device for its initial status. As described above, the initial status of a projection device may include the current settings of the device at the moment of querying. The projection device receives the query, parses the query, and responds with a response document containing the initial status of the projection device. The response document is received, at 52, and saved, at 54. It is not required that the response be parsed.

Method 48 further includes sending one or more command documents to the coupled projector altering the initial status, at 56. Each command document may include a single command or multiple commands. Also, as described above, the commands may be based on the response document provided by the projection device.

Method 48 further includes, at 58, restoring the projection device to its initial status. In some embodiments, the controller may use a prior response document as a command document to return or restore the projection device to the initial state. Sending the response document to the device as a command document effectively restores the device to the state when the response document was produced. For example, the method may include retrieving the original response document containing the initial status of the projection device and restoring the projection device to its initial status by sending the response document, as a command document, back to the projection device, at 58. This process restores the projection device to its initial state.

The response document may be sent back to the projection device without ever being parsed, interpreted and/or reformed because the response document itself may function as a command document. Symmetry is preserved in the command/response documents in the sense that the response document may be sent as a command document.

In some embodiments, command documents may include a password protection mechanism within the PCML document. The password feature may restrict access and/or use of the projection device, or programming of the projection device. For example, system 10 may be configured to validate a command when a password is included within the command document. The password or passwords may activate the command such that the command is operative when sent to the projection device. In contrast, a command without a password or with an incorrect password may be treated as an invalidated command, which may be ignored by the projection device. The password may be a global password, or a specific password settable by an administrator of the system. Furthermore, the password may be write-only, such that other users are unable to read the working password.

It should be appreciated that PCML may be used with application programs adapted for use within the projection systems described above. For example, communications between projection devices and a server using PCML may be used in a projection management system as illustrated and described in U.S. application Ser. No. 10/194,334, of Steve Murtha, De Tran, James D. Wenban, Alan Cossitt, and Joe Castaldi entitled PROJECTION DEVICE MANAGEMENT SYSTEM, filed contemporaneously with the present application, and hereby incorporated by reference.

It further should be appreciated that PCML may be used with other types of controllable devices or in combination with projection devices. For example, PCML may be used to control any device with a controllable state, including, but not limited to, multi-media devices, including multi-media control devices; home-entertainment centers and other similar devices; audio devices, including stereos, amplifiers, tuners, mixers, etc.; test and measurement instruments; as well as other controllable appliances. For example, a controller may query a controllable device, such as an audio device, as to its current state. The device may respond with a response document containing the device's current state. The controller may then use the response document as a command document restoring the device to the previously queried state. No prior knowledge is needed of the command set for the controllable device. For illustrative purposes only, and not as a limitation, PCML may enable a controller to query and control the settings of an audio device, including balance settings, volume settings, tone controls, echo settings, etc. Similarly, PCML also may be used to control physical devices with multiple settings coupled with a controller, including, but not limited to, lighting, curtains, screens, etc. For example, a controller may use PCML to control the intensity of ambient lighting in a room or the position of curtains and screens.

While various alternative embodiments and arrangements for a projection system using PCML have been shown and described above, it will be appreciated by those of skill in the art that numerous other embodiments, arrangements, and modifications are possible and are within the scope of the invention. Thus, although the present invention has been disclosed in specific embodiments thereof, the specific embodiments are not to be considered in a limiting sense, because numerous variations are possible. The subject matter of the invention includes all novel and nonobvious combinations and subcombinations of the various elements, features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring, nor excluding, two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the invention of the present disclosure.

We claim:

1. A system comprising:
    a controller configured to be linked to at least a first projection device and a second projection device via a network, the first projection device responsive to a first command language, and the second projection device responsive to a second command language different from said first command language, the controller further configured to:
        query the first projection device using a projector control markup language defined in an extensible markup language;
        query the second projection device using said projector control markup language;
        receive a first response from said first projection device in response to said query of said first projection device;
        receive a second response from said second projection device in response to said query of said second projection device;
        send a first command to said first projection device based on said first response from said first projection device; and
        send a second command to said second projection device based on said second response from said second projection device.

2. The projection system of claim 1, wherein the controller is configured to send a query document requesting status of one of the projection devices.

3. The projection system of claim 2, wherein the controller is configured to receive a response document from said one of the projection devices reporting a current status of said one of the projection devices.

4. The projection system of claim 2, wherein the controller is configured to receive a response document from said one of the projection devices reporting ranges for at least one adjustable feature.

5. The projection system of claim 3, wherein the controller is configured to resend the response document as a command document to restore said one of the projection devices to a status when the response document was generated.

6. The projection system of claim 1, wherein the projector control markup language includes a root element <pcm1/>.

7. The projection system of claim 6, wherein the root element <pcm1/> is configured to generally query the entire state of one of the projection devices.

8. The projection system of claim 1, wherein one of the projection devices is coupled to a projector control markup language interpreter.

9. The projection system of claim 8, wherein the projector control markup language interpreter includes an extensible markup language parser.

10. The projection system of claim 8, wherein the projector control markup language interpreter includes an extensible markup language validator.

11. The projection system of claim 1, wherein projector control markup language includes multiple child elements, including at least one selected from the group of system, status, and administration.

12. The projection system of claim 1, wherein projector control markup language includes a password protection mechanism.

13. A method for controlling at least a first projection device having a first command language and a second projection device having a second command language, the method comprising:
    querying the first projection device for its capabilities using a projector control markup language and receiving a first response document in response thereto, said projector control markup language defined using extensible markup language;
    querying the second projection device for its capabilities using said projector control markup language and receiving a second response document in response thereto;
    identifying the capabilities of the first projection device via said first response document;
    identifying the capabilities of the second projection device via said second response document;
    controlling the first projection device using the first response document; and
    controlling the second projection device using the second response document.

14. The method of claim 13, wherein identifying the capabilities of one of the projection devices includes identifying a current status of said one of the projection devices.

15. The method of claim 14, wherein controlling one of the projection devices includes resending the response document to said one of the projection devices as a command document.

16. The method of claim 13, wherein identifying the capabilities of one of the projection devices includes identifying ranges for each adjustable feature said one of the projection device.

17. The method of claim 13, wherein identifying the capabilities of one of the projection devices includes identifying a set of commands said one of the projection devices is configured to respond to.

18. A program storage device readable by a machine, the storage device tangibly embodying a program of instructions executable by the machine to control a projection device, the device comprising:
    instructions for sending projector control markup language command documents defined in extensible markup language to each of a first and second projection device to query said devices, the first and second projection devices having different command languages;
    instructions for receiving response documents from the projection devices identifying respective information about the first and second projection device; and
    instructions for sending commands to the first and second projection devices based on their respective response documents to control the projection devices according to respective desired states.

19. A method for controlling a plurality of projection devices, the method comprising:
    sending a first query document defined in extensible markup language to a first projection device requesting a state of the device;
    sending a second query document defined in extensible markup language to a second projection device requesting a state of the device;

receiving a first response document defined in extensible markup language from the first projection device including the state of the projection device;

receiving a second response document defined in extensible markup language from the second projection device including the state of the projection device;

sending the first response document back to the first projection device as a first command thereby directing the first projection device to be restored to the state of the first projection device when the first response document from the first projection device was generated; and sending the second response document back to the second projection device as a second command thereby directing the second projection device to be restored to the state of the second projection device when the second response document from the second projection device was generated.

20. A system comprising:

a program storage device readable by a machine, the storage device tangibly embodying a program of instructions executable by the machine, said device configured to control any of a plurality of projection devices, where the projections device are responsive to different command languages unknown to said device, the device comprising:

instructions for sending projector control markup language command documents defined in extensible markup language to said plurality of projection devices to query said devices;

instructions for receiving response documents from the projection devices identifying respective information about the projection devices; and instructions for sending commands to the projection devices in extensible markup language based on their respective response documents to control the projection devices according to respective desired states.

* * * * *